March 12, 1929.  L. S. BRADLEY  1,704,910
LUG LOCK FOR TIRES
Filed Dec. 9, 1925

Inventor
Leroy S. Bradley
by Hazard and Miller
Attorneys

Patented Mar. 12, 1929.

1,704,910

UNITED STATES PATENT OFFICE.

LEROY S. BRADLEY, OF LOS ANGELES, CALIFORNIA.

LUG LOCK FOR TIRES.

Application filed December 9, 1925. Serial No. 74,286.

My invention is a lug lock for automobile tires adapted to lock the lugs which hold the rims on the wheels, in the use of demountable rims, and my invention also includes a locking lug to fasten the nuts of demountable wheels.

An object of my invention is to prevent the theft of inflated tires, with the demountable rims or wheels to which they are secured and the lock may be used directly on the wheels and in some types of tire and wheel carriers to lock the spare tire or spare wheel.

In my invention as applied to demountable rims with inflated tires thereon I provide one or more lugs, used for wedging the rim on the wheel felloe with locks having bolts which engage the nuts of the rim bolts and prevent their unscrewing. The lugs are substantially the size of ordinary lugs with a recess formed at one end in which a lock may be pressed and secured and preferably a shoulder extends outwardly from the lug to center a socket wrench. When the nut of the rim bolt is screwed fully home the lock will be operated to force its bolt to close proximity with one of the faces of the rim bolt nut and thus prevent unscrewing of such nut.

In my invention as applied to demountable wheels, with inflated tires thereon, I provide a lug with a lock secured therein and fit the lug over one or more of the hub studs or bolts. When the nut on the hub stud is screwed home and the lock bolt turned into proximity therewith the nut cannot be unscrewed. In both the constructions the lugs are made with a pin or other device rigidly engaging the wheel to prevent the turning of the lug with the securing nut.

My invention will be more readily understood from the following description together with the drawings, in which.

Figures 1, 4:
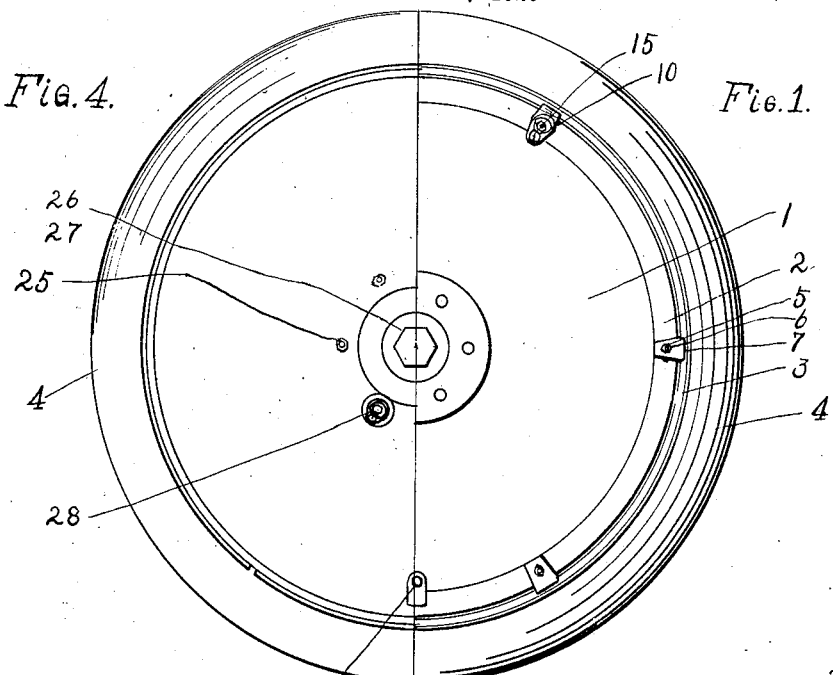
Figure 1 is a half elevation of an automobile wheel of the type having a demountable rim, with an inflated tire thereon. The locking lug is shown in connection with a disk type of wheel, the lug being secured to one of the rim bolts about opposite the tire valve.
Figure 4 is a half elevation of a demountable wheel, of the disk type, with my locking lug securing one of the hub stud nuts locked.
Figure 2:
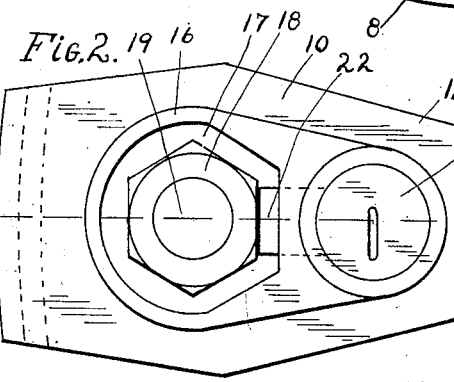
Figure 2 is a face view of the locking lug used in Figure 1, showing the bolt of the lock engaging a side of the rim bolt nut; and a raised shoulder around the nut.
Figure 3:
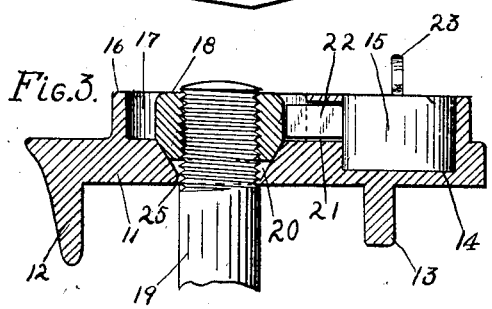
Figure 3 is a section of Figure 2 on the line 3—3.

My invention as illustrated in Figures 1, 2 and 3 is substantially as follows:—A wheel body, shown as of a disk type, is designated by the numeral 1 and has a rim 2 or felloe section, this latter supporting a demountable rim 3 carrying an inflated tire 4. The rim or felloe is provided with the usual rim bolts 5 to which are secured, by nuts 6, the usual wedging lugs 7. The tire valve is designated by the numeral 8.

My special locking lug is designated generally by the numeral 10, a detail showing of which is given in Figures 2 and 3. The lug comprises a body structure 11, having the rim wedge 12 along one edge on the desired curvature of the wheel and demountable rim. A pin or projection 13 is made integral with the body of the lug and is intended to fit in a socket or hole in the wheel, the wheel rim or felloe to prevent turning the lug, should it be possible to separate the rim wedge 12 from between the wheel rim and demountable rim. A recess 14 is formed in the lug and houses a lock 15, which may be of any suitable type, secured in place in the usual way.

A shoulder 16 extends outwardly from the face side of the lug and forms a socket 17, of annular shape, around the nut 18, which is threaded on the rim bolt 19, which extends through the hole 20 in the lug. In the drawing the nut is shown partly tapered and the hole 20 tapered to fit the taper of the nut. The lugs are made having tapered and cylindrical holes to fit the particular type of nuts used on the rim bolts of different makes of automobiles. An aperture 21 leads from the lock recess 14 to the annular space 17 and forms the slideway for the bolt 22 of the lock, such bolt being operated by the key 23.

The manner of using my lug lock of Figs. 1, 2 and 3 is substantially as follows:

The lug lock is utilized in the place of one of the ordinary clamping lugs for the spare tire and is preferably positioned on the side of the wheel opposite the valve stem in which case only one lug lock is required for a tire. The lug is placed over the rim bolt with the rim wedge 12 engaging between the wheel rim and the tire rim and with the projecting pin 13 inserted in a socket or aperture in the wheel. After the nuts on the rim bolts have been screwed home the nut on the lug lock will be adjusted so that one face of the nut will be substantially square to the end of the lock bolt 22. The lock is then operated by the key 23 to project the bolt outwardly until the end of the bolt is contiguous to one of the faces of the nut. This prevents the nut from being unscrewed and the lock bolt prevents the inserting of a socket or other wrench around the nut. The shoulder 16 also prevents a person from utilizing a heavy wrench or a cold chisel to break off the nut or to destroy the lock or the bolt of the lock.

My lug lock of Figs. 4, 5 and 6 for utilization with a spare wheel is constructed substantially as follows:

The tire 4 is attached in any suitable way to a spare wheel 25, the latter being fastened to a hub 26 by means of hub studs or bolts 27 of which in the illustration only three are shown. My lug lock is designated generally by the numeral 28 having a body portion 29, which is preferably in the form of a disc. A hole 30 is left through the center of the body to accommodate the hub stud 31 on which the nut 32 is threaded. A shoulder 33 surrounds the nut, leaving an annular space 34 for the insertion of a socket wrench or the like. The body portion of the lug is provided with a pin projection 35, said projection fitting in a hole or a socket in the spare wheel or in the hub to prevent turning of the whole lug when the nut 32 is unscrewed.

A lock 36 of any suitable character is inserted in a recess 37 and has a bolt 38 operating through a slideway 29 into the annular space 34. A key 40 is utilized to lock and unlock the lock and thus thrust the bolt against one face of the nut 32, thereby preventing its rotation.

Figure 5:
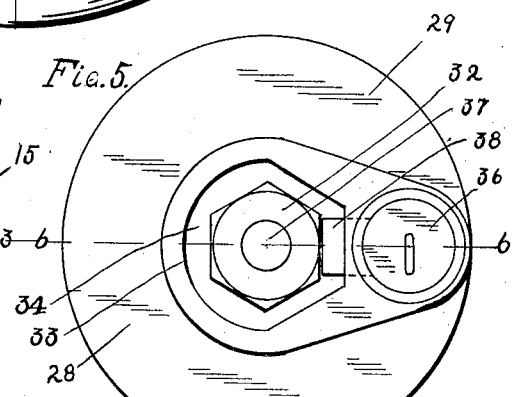
Figure 5 is a face view of the locking lug of Figure 4, showing it made circular for the sake of symmetry.
Figure 6:
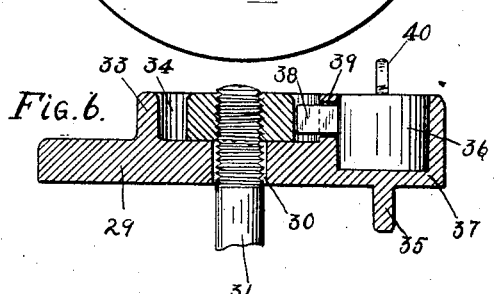
Figure 6 is a section of Figure 5 on the line 6—6.

The manner of use of my lug lock of Figs. 4, 5 and 6 is substantially the same in principle as that of the lug lock of Figs. 1, 2, and 3, both locks being secured to the bolt which holds either the tire on a wheel or a spare wheel on the hub.

It is obvious that my invention may be considerably modified to suit particular types of lugs for fastening demountable rims to the wheel rims and also that the lug lock for securing the spare wheels to hubs may likewise be materially altered. Such changes may be made in my invention without departing from the spirit thereof as set forth in the description and drawings and claims.

Having described my invention, what I claim is:

1. A lug lock comprising a plate-like body structure, means on the inner surface of the structure forming a lug adapted to interengage with a wheel to prevent rotation of the plate like body, said plate like body having an opening therethrough for the insertion of a bolt and having an outer surface to be engaged by a nut threaded on the said bolt and a lock secured in the body structure having a bolt, said bolt being positioned in the locked position to engage the nut and prevent rotation thereof.

2. A lug lock as claimed in claim 1, having in addition a shoulder extending outwardly from the outward surface and forming a space around the position occupied by the nut.

3. A lug lock comprising a substantially flat plate-like structure having an opening therethrough for the passage of a bolt, an inner surface adapted to engage with a wheel and having means to prevent rotation of the structure, a rim on the outer surface of the structure forming a space around the opening, said space being sufficient to allow rotation of a nut on a bolt fitting the opening, a lock mounted in the body structure and a bolt operated by the lock, having sliding movement into the said space, said bolt being positioned to engage the outer face of a nut on a bolt inserted through the opening.

4. A lug lock comprising in combination a lug having a substantially flat inner surface with a pin projecting therefrom, adapted to engage in a socket in a wheel to prevent rotation of the lug, said lug having an opening therethrough for the insertion of a bolt and having a recess for the insertion of a lock, a rim extending outwardly from the outward surface of the lug, spaced from the said opening, a slideway between the recess for the lock and the said space, a lock mounted in the recess having a bolt slidable in the said slideway, said bolt being positioned for the outer end to engage one of the side faces of a nut secured to a bolt extending through the opening when said nut bears on the outer surface of the lug.

5. A lug lock as claimed in claim 4, having in addition a rim wedge extending inwardly from one edge of the lug adapted to engage between the wheel and the rim of a demountable type rim.

In testimony whereof I have signed my name to this specification.

L. S. BRADLEY.